(12) United States Patent
Elgar et al.

(10) Patent No.: US 7,946,490 B2
(45) Date of Patent: May 24, 2011

(54) COMPUTERIZED CARD PRODUCTION EQUIPMENT

(75) Inventors: Adam Elgar, Brooklyn, NY (US); Tom Elgar, London (GB)

(73) Assignee: Serverside Group Limited, London (GB)

( * ) Notice: Subject to any disclaimer, the term of this patent is extended or adjusted under 35 U.S.C. 154(b) by 274 days.

(21) Appl. No.: 12/132,516

(22) Filed: Jun. 3, 2008

(65) Prior Publication Data

US 2008/0230616 A1    Sep. 25, 2008

Related U.S. Application Data

(63) Continuation of application No. 10/545,833, filed as application No. PCT/GB2004/00626 on Feb. 17, 2004, and a continuation-in-part of application No. 10/406,519, filed on Apr. 3, 2003.

(60) Provisional application No. 60/447,972, filed on Feb. 18, 2003.

(51) Int. Cl.
*G06K 7/10* (2006.01)

(52) U.S. Cl. .................................. 235/462.01; 235/380

(58) Field of Classification Search .............. 235/462.01, 235/380; 382/100; 358/1.6
See application file for complete search history.

(56) References Cited

U.S. PATENT DOCUMENTS

| | | | |
|---|---|---|---|
| 5,410,642 | A | 4/1995 | Hakamatsuka et al. |
| 5,771,071 | A | 6/1998 | Bradley et al. |
| 5,886,334 | A | 3/1999 | D'Entremont et al. |

(Continued)

FOREIGN PATENT DOCUMENTS

DE    100 55 649 A1    5/2002

(Continued)

OTHER PUBLICATIONS

Claessens, J. et al. On the Security of Today's Online Electronic Banking Systems, *Computers & Security*, vol. 21, No. 3, pp. 257-269, 2002.

(Continued)

*Primary Examiner* — Allyson N Trail
(74) *Attorney, Agent, or Firm* — McDermott Will & Emery LLP

(57) ABSTRACT

An apparatus and method for manipulating images is disclosed. In one embodiment according to the invention, a method for manipulating images comprises: displaying for manipulation at a browser-based user interface a graphical representation of at least a portion of an image held at a remote image store; providing an internet communications link coupling the user interface to a remote image processor; transferring information about manipulations applied to the graphical representation between the user interface and the remote image processor; and causing the remote image processor to access the remote image store and apply, to at least a portion of the image held in the store, manipulations emulating those applied to the graphical representation. In another embodiment according to the invention, there is disclosed a method for applying a personalized image to a financial account access means corresponding to a financial account of a customer. The method comprises: associating financial data, corresponding to the financial account of the customer, with a customer image identifier in a financial account association table maintained securely from a user interface; associating the customer image identifier with user image selection data based on user selections made on the user interface in relation to a graphical representation of at least a portion of an original image held in an image store; and applying the personalized image to the financial account access means, the personalized image being based on the user image selection data associated with the customer image identifier.

31 Claims, 13 Drawing Sheets

U.S. PATENT DOCUMENTS

| | | | |
|---|---|---|---|
| 5,889,941 A | 3/1999 | Tushie et al. | |
| 5,909,673 A | 6/1999 | Gregory | |
| 6,167,382 A | 12/2000 | Sparks et al. | |
| 6,328,209 B1 | 12/2001 | O'Boyle | |
| 6,344,853 B1 | 2/2002 | Knight | |
| 6,493,677 B1 | 12/2002 | Von Rosen et al. | |
| 6,845,365 B2 | 1/2005 | von Rosen et al. | |
| 6,968,335 B2 | 11/2005 | Bayliss et al. | |
| 7,016,869 B1 | 3/2006 | Haeberli | |
| 7,103,230 B1 | 9/2006 | Jam et al. | |
| 7,360,692 B2 | 4/2008 | Zeller et al. | |
| 7,576,752 B1 | 8/2009 | Benson et al. | |
| 2001/0051876 A1 | 12/2001 | Seigel et al. | |
| 2002/0025085 A1 | 2/2002 | Gustafson et al. | |
| 2002/0057454 A1 | 5/2002 | Ueda et al. | |
| 2002/0059278 A1 | 5/2002 | Bailey et al. | |
| 2002/0062264 A1 | 5/2002 | Knight | |
| 2002/0067500 A1 | 6/2002 | Yokomizo et al. | |
| 2002/0078146 A1 | 6/2002 | Rhoads | |
| 2002/0152166 A1 | 10/2002 | Dutta et al. | |
| 2002/0175931 A1 | 11/2002 | Holtz et al. | |
| 2003/0069809 A1 | 4/2003 | von Rosen et al. | |
| 2004/0093527 A1 | 5/2004 | Pering et al. | |
| 2004/0099730 A1* | 5/2004 | Tuchler et al. | 235/380 |
| 2004/0144472 A1 | 7/2004 | Cowie | |
| 2004/0160624 A1 | 8/2004 | Elgar et al. | |
| 2004/0254833 A1 | 12/2004 | Algiene | |
| 2005/0167487 A1* | 8/2005 | Conlon et al. | 235/380 |
| 2006/0200533 A1 | 9/2006 | Holenstein et al. | |
| 2007/0075134 A1 | 4/2007 | Perlow et al. | |
| 2007/0102510 A1 | 5/2007 | Beemer et al. | |
| 2007/0156837 A1 | 7/2007 | Elgar et al. | |
| 2007/0185795 A1 | 8/2007 | Petrime et al. | |
| 2007/0215699 A1 | 9/2007 | Arego et al. | |
| 2007/0219809 A1 | 9/2007 | Peyton | |
| 2007/0267486 A1 | 11/2007 | Ferrara et al. | |
| 2008/0230616 A1 | 9/2008 | Elgar et al. | |
| 2008/0308636 A1 | 12/2008 | Lynch et al. | |
| 2009/0052736 A1* | 2/2009 | Kacker | 382/100 |

FOREIGN PATENT DOCUMENTS

| | | |
|---|---|---|
| EP | 0412520 A2 | 2/1991 |
| EP | 0860986 | 10/1998 |
| EP | 0 878 956 A1 | 11/1998 |
| EP | 1602072 B1 | 9/2007 |
| EP | 1847964 A2 | 10/2007 |
| EP | 1847964 A3 | 12/2007 |
| JP | 2000/190669 A | 11/2000 |
| KR | 2002 033 704 A | 5/2002 |
| WO | WO 98/04988 | 2/1998 |
| WO | WO 01/77858 A2 | 10/2001 |
| WO | WO 02/39329 A2 | 5/2002 |
| WO | WO 02/067528 A | 8/2002 |
| WO | WO 03/085573 A1 | 10/2003 |
| WO | 2004074961 A2 | 9/2004 |
| WO | WO 2004/074961 A1 | 9/2004 |
| WO | WO 2005/081128 A | 9/2005 |
| WO | WO 2006/018624 A | 2/2006 |
| WO | WO 2006/018636 A | 2/2006 |

OTHER PUBLICATIONS

International Search Report for PCT/GB2004/000626, dated May 25, 2005.
Entwicklung von Rich-Internet-Anwendungen mit Macromedia MX. Macromedia White Papers Apr. 2002.
EPO Examination Report, dated Aug. 31, 2006.
Perfetti, et al. Macromedia Flash: A New Hope for Web Applications. User Interface Engineering White Papers 2002, pp. 1-17.
Dahm, T. "Search Engine Tip: Beware of Query Strings"—http://www.netmechanic.com/news/vol2/search_no11.htm, Dec. 1999, vol. 2, No. 11.
Kochhar, J. "Posting HTML Form Data as XML Strings"—http://www.informit.com/articles/article.aspx?p=21906, Jun. 29, 2001.
Kochhar, J. "Transforming HTML Form Data as XML Strings Using Java" http://www.peachpit.com/articles/article.aspx?p=23607, Oct. 12, 2001.
Thomason, L. "Beginner Tip: Form Processing Basics"—http://www.netmechanic.com/news/vol5/beginner_no19.htm, Oct. 2002, vol. 5, No. 19.
Sheriff, Paul D. "Introduction to ASP.NET and Web Forms", .NET Development (General) Technical Articles, Paul D. Sheriff, Nov. 2001—http://msdn.microsoft.com/en-us/library/ms973868(printer).aspx.
Microsoft IIS Web Server and ASP.NET: "Please help with a simple flash input form"—http//www.webmasterworld.com/forum47/45.htm, printed on May 15, 2008.
"Macromedia Fireworks 4—Using Fireworks and Flash Together: Importing PNG files with transparency"—http://www.adobe.com/support/fireworks/programs/fw_to_flash/fw_to_flash05.html, printed on May 15, 2008.
"TechNote: Transparency Support in Flash"—http://kb.adobe.com/selfservice/viewContent.do?externalId=tn_12804, printed on May 15, 2008.
"An Overview of the File Transfer Protocol"—http://www.ncftp.com/libncftp/doc/ftp_overview.html, printed on May 15, 2008.
Vuong, A. "Home PC surfers accelerate use of high-speed connections", Andy Vuong, The Denver Post, Feb. 9, 2001.
"Internet Time: History of Computer Networking 1998-2003"—http://compnetworking.about.com/od/basicnetworkingconcepts/1/aa021403a.htm, printed on May 15, 2008.
"Global Napster Usage Plummets, but New File-Sharing Alternatives Gaining Ground, Reports Jupiter Media Metrix"—http://www.comscore.com/press/release.asp?id=249, printed on May 15, 2008.
Affidavit of Dr. Steve G. Belovich, dated Mar. 23, 2010, in the Matter of the Opposition to the Grant of Indian Patent No. 3046/CHENP/2005, filed Nov. 17, 2005. Parties: *Dimpledough Inc.*, Opponent v. *Serverside Group Limited*, Patentee.
Affidavit of Tom Elgar, dated May 9, 2010, in the Matter of the Opposition to the Grant of Indian Patent No. 3046/CHENP/2005, filed Nov. 17, 2005. Parties: *Dimpledough Inc.*, Opponent v. *Serverside Group Limited*, Patentee.
Letter, dated Jul. 30, 2010, from Ritushka Negi, with Affidavit of Dr. Steve G. Belovich, dated Jul. 26, 2010, in the Matter of the Opposition to the Grant of Indian Patent No. 3046/CHENP/2005, filed Nov. 17, 2005. Parties: *Dimpledough Inc.*, Opponent v. *Serverside Group Limited*, Patentee.
Affidavit of Tom Elgar, dated Aug. 31, 2010, in the Matter of the Opposition to the Grant of Indian Patent No. 3046/CHENP/2005, filed Nov. 17, 2005. Parties: *Dimpledough Inc.*, Opponent v. *Serverside Group Limited*, Patentee.
Office Action, dated Jan. 7, 2011, for U.S. Appl. No. 12/954,277, filed Nov. 24, 2010 (Continuation Application of instant application, U.S. Appl. No. 12/132,516, filed Jun. 3, 2008).

* cited by examiner

COMPUTERIZED CARD PRODUCTION EQUIPMENT

CROSS-REFERENCE TO RELATED APPLICATIONS

This application is a continuation of U.S. patent application Ser. No. 10/545,833 of Elgar et al., accorded a filing date of Nov. 2, 2006, entitled "Apparatus and Method for Manipulating Images,"; which is a United States National Filing under 35 U.S.C. 371 of PCT Application No. PCT/GB2004/000626 of Elgar et al., entitled "Apparatus and Method for Manipulating Images"; filed Feb. 17, 2004; which claims the benefit of U.S. Provisional Application Ser. No. 60/447,972 of Elgar et al., filed Feb. 18, 2003, entitled "Method and Apparatus for Manipulating Images"; and which is a Continuation in Part of U.S. patent application Ser. No. 10/406,519 of Elgar et al., filed Apr. 3, 2003, entitled "Apparatus and Method for Manipulating Images". The contents of all of these applications are hereby incorporated herein by reference.

TECHNICAL FIELD

This invention relates to methods and apparatus for manipulating images; and in particular to methods and apparatus for reproducing personalized images on consumer goods at locations remote from a user. The preferred embodiment includes on-line product-based image manipulation software.

BACKGROUND

There has been an increasing consumer desire for self-differentiation, particularly for differentiating mass-marketed personal items. This can be clearly seen in the recent popularity of customized mobile phone ring-tones and fascias. In order to provide personalized graphics on consumer products, there has therefore been a need for a quick and easy-to-use graphics manipulation suite to allow users to make product-specific designs, particularly from locations remote from the main image storage and printing facility. However, providing such a graphics manipulation suite over the Internet has not proved easy.

One problem stems from the open nature of the Internet itself. In order to allow Internet users to visit hundreds of thousands of unverified web sites, and yet still protect the user's computer from viruses and malicious hackers, a browser must not allow the web sites to access files on the user's computer. Thus, browsers are "dummy terminals," albeit very powerful ones; it is not easy to actively "do" anything with an Internet browser—it simply navigates between online resources and presents information and images to the user. Thus, for designing a graphical image for application to a personal item, an internet user may be able to manipulate images within the browser environment, but will not be able to save the images.

The problem of manipulating images to be applied to an article remote from the user has previously been solved in two ways, each of which has disadvantages. In one solution, a user manipulates images on his or her own machine without the use of a browser. This solution has the advantage of being extremely fast once installed on the local machine, but suffers from three major failings. First, in order to allow the program to run on the client machine, the user must first download a program. This takes time, and is inconvenient, because the software cannot be seen or tested until it is fully downloaded. Next, the program must be installed on the user's machine, where it will remain permanently until removed. This occupies storage space on the client hard drive, slows down the user's computer, and can cause system crashes. Finally, the downloaded program may have computer viruses.

In another image manipulation solution, an image is manipulated directly on a server using Java Applets, or another plug-in that functions in a similar fashion, such as a custom Activex control. Each time the user uses the interface to make a manipulation to the image, a separate call is made to the server; the server software changes the image's position, and sends back the information to the client machine. The theoretical advantages of Java and similar programs are that they can run on any client machine with identical results; and that the software does not need to be installed on the client machine, because the Java Applet runs within a Java Virtual Machine of the browser. However, the problem with Java and similar programs is that the Internet simply is not fast enough to provide a pleasant user experience. Also, in practice, because the Java Applet does not know which type of machine it will be run on, it can react very differently from one machine to the next.

SUMMARY

In one embodiment according to the invention, there is disclosed a computer system for manipulation of remote images. The computer system comprises: a browser-based user interface for displaying for manipulation a graphical representation of at least a portion of an image held at a remote image store; an internet communications link coupling the user interface to a remote image processor, said link being operable to transfer information about manipulations applied to the graphical representation between the user interface and the remote image processor; and means for the remote image processor to access the remote image store in order to apply to the image held in the store manipulations emulating those applied to the graphical representation.

In related embodiments, the image held at the remote image store may be of a relatively higher resolution than the graphical representation of at least a portion of the image. The remote image processor may further comprise means for communicating a version of the image, comprising the applied manipulations, to an image printing means maintained securely from the user interface. The computer system may further comprise means for associating a unique identifier with a user applying the manipulations to the graphical representation; wherein the internet communications link is operable to transfer the unique identifier between the user interface and the remote image processor. The remote image processor may also comprise means for receiving a hash value, which relates to a user who applied the manipulations to the graphical representation. The browser-based user interface may be presented on a kiosk accessible to a consumer. The kiosk may comprise a printer for printing an image, produced by applying the manipulations that emulate those applied to the graphical representation, onto a consumer item. The computer system may also further comprise a database capable of storing the information about the manipulations applied to the graphical representation; such that a manipulation can be applied to the image held in the remote image store, other than in real time, or alternatively, allowing printing tasks to different articles to be batched. The computer system may further comprise a printer for printing an image, produced by applying the manipulations that emulate those applied to the graphical representation, onto a consumer item. The consumer item may comprise a financial account access means.

In another embodiment according to the invention, there is disclosed a method of operating a computer system for manipulation of remote images. The method comprises: displaying for manipulation at a browser-based user interface a graphical representation of at least a portion of an image held at a remote image store; providing an internet communications link coupling the user interface to a remote image processor; transferring information about manipulations applied to the graphical representation between the user interface and the remote image processor; and causing the remote image processor to access the remote image store and to apply, to at least a portion of the image held in the store, manipulations emulating those applied to the graphical representation.

In related embodiments, the method may further comprise transferring a unique identifier between the user interface and the remote image processor, the unique identifier being associated with a user applying the manipulations to the graphical representation. The method may also comprise receiving a hash value at the remote image processor, the hash value relating to a user applying the manipulations to the graphical representation; or presenting the browser-based user interface on a kiosk accessible to a consumer. A printer at the kiosk may be used to print an image, produced by applying the manipulations that emulate those applied to the graphical representation, onto a consumer item. The method may also further comprise storing information about the manipulations applied to the graphical representation in a database, such that the manipulations can be applied to the image held in the remote image store, other than in real time, or alternatively, allowing printing tasks to different articles to be batched. The method may also comprise printing an image, produced by applying the manipulations that emulate those applied to the graphical representation, onto a consumer item, which may comprise a financial account access means.

In another embodiment according to the invention, there is disclosed a computer program product comprising program code means, said program code means including: first code means for displaying for manipulation at a browser-based user interface one or more graphical representations of at least a portion of an image held at a remote image store; second code means for establishing an internet communications link coupling the user interface to a remote image processor; third code means for transferring information about manipulations applied to the graphical representation between the user interface and the remote image processor; and fourth code means for causing the remote image processor to access the remote image store and to apply to at least a portion of the image held in the store manipulations emulating those applied to the graphical representation.

In a further embodiment according to the invention, there is disclosed a computer system for manipulation of remote images. The computer system comprises: a front end server system for operating computer program means for providing a user interface for displaying a graphical representation of at least a portion of an image held at a remote image store for user selection from amongst a plurality of similar such graphical representations of at least a portion of each of a plurality of images held at the remote image store; and an internet communications link coupling the front end server system to a remote image processor capable of accessing the remote image store in order to select the original image held in the store, from amongst the plurality of similar such images held in the store, in a corresponding fashion to the user selection made on the user interface.

In a related embodiment, the computer program means may further comprise means for enabling user manipulation of the graphical representation on the user interface; and the remote image processor may comprise means for accessing the remote image store in order to apply to the image held in the store manipulations emulating the user manipulations of the graphical representation on the user interface.

In another embodiment according to the invention, there is disclosed a system for applying a personalized image to a financial account access means corresponding to a financial account of a customer. The system comprises: a financial account association table associating financial data, corresponding to the financial account of the customer, with a customer identifier; an image manipulation emulator for associating the customer identifier with user image selection data based on user selections made on a user interface in relation to a graphical representation of at least a portion of an original image held in an image store; and an image application means for applying the personalized image to the financial account access means, the personalized image being based on the user image selection data associated with the customer identifier by the image manipulation emulator; wherein the system maintains at least the financial account association table securely from the user interface.

In further related embodiments, the system may further comprise a front end server for presenting the user interface; and a back end server, comprising the image manipulation emulator, for communicating with the front end server and with the image store. The front end server may further comprise means for communicating a user manipulation data string to the back end server. The financial account access means may comprise a credit card, debit card, or other transaction card means. The graphical representation of the original image may comprise a re-sized version of the original image. The original image may be uploaded from the customer's own computer. The user selections may comprise operations selected from rotating, re-sizing, positioning, flipping, controlling brightness, performing red-eye reduction, and adjusting opacity levels. The user selection data may further comprise data relating to at least one image for overlaying onto the original image; and the data relating to the at least one image for overlaying onto the original image may comprise at least one transparent portion. The user selections may also comprise operations for positioning at least a portion of the original image within a window region of the financial account access means. The window region may exclude regions of the financial account access means that display functional features of the financial account access means. The user selections may also comprise operations for positioning at least a portion of the original image in relation to a template of features of the financial account access means. The financial account access means may comprise one of a credit card, debit card, or other transaction card means; and the features of the financial account access means may comprise one or more of a bank logo, a transaction card hologram, and a transaction card type indicator.

In another embodiment according to the invention, there is disclosed a method for applying a personalized image to a financial account access means corresponding to a financial account of a customer. The method comprises: associating financial data, corresponding to the financial account of the customer, with a customer identifier in a financial account association table maintained securely from a user interface; associating the customer identifier with user image selection data based on user selections made on the user interface in relation to a graphical representation of at least a portion of an original image held in an image store; and applying the personalized image to the financial account access means, the personalized image being based on the user image selection data associated with the customer identifier.

In further related embodiments, the method further comprises presenting the user interface using a front end server; and using a back end server, in communication with the front end server and the image store, to re-create the user selections made on the user interface. The method may also further comprise communicating a user manipulation data string from the front end server to the back end server. The financial account access means may comprise a credit card, debit card, or other transaction card means. The graphical representation of the original image may comprise a re-sized version of the original image. The method may further comprise uploading the original image from the customer's own computer. The user selections may comprise operations selected from rotating, re-sizing, positioning, flipping, controlling brightness, performing red-eye reduction, and adjusting opacity levels. The user image selection data may further comprise data relating to at least one image for overlaying onto the original image, where the at least one image for overlaying may comprise at least one transparent portion. The user selections may comprise operations for positioning at least a portion of the original image within a window region of the financial account access means. The window region may exclude regions of the financial account access means that display functional features of the financial account access means. The user selections may comprise operations for positioning at least a portion of the original image relative to a template relating to features of the financial account access means. The financial account access means may comprise a credit card, debit card, or other transaction card means; and the features of the financial account access means may comprise one or more of a bank logo, a transaction card hologram, and a transaction card type indicator.

In another embodiment according to the invention, there is disclosed a method of operating a computer system to apply a personalized image to a financial transaction card. The method comprises: providing a financial account association table associating financial data of a customer with a customer identifier; receiving at an image processor a set of manipulations applied to a representation of an image at a remote user terminal, to generate a personalized design; processing the represented image by applying the received set of manipulations to produce a personalized image; and sending the personalized image for application to a financial transaction card, provided with banking features based on at least the customer identifier.

In a further embodiment according to the invention, there is disclosed a computer system for controlling production of a personalized financial transaction card. The computer system comprises: a financial account association table associating financial data of a customer with a customer identifier; a communication interface arranged to receive a set of manipulations applied to a representation of an image at a remote user terminal to generate a personalized design; an image processor to process the represented image by applying said set of manipulations to produce a personalized image; and financial card production equipment capable of receiving the personalized image and relevant financial data based on the customer identifier to produce a personalized financial transaction card.

In another embodiment according to the invention, there is disclosed a method of operating a computer system to produce a personalized financial transaction card. The method comprises: receiving a unique one-way code generated within a secure environment from information relating to a customer account; receiving at an image processor an image, and manipulating the image in accordance with instructions from a remote terminal operated by said customer; storing the manipulated image in association with the one-way code; and providing said manipulated image for application to a financial transaction card, responsive to a request comprising an identical one-way code generated independently from said customer account information.

In a further embodiment according to the invention, there is disclosed a computer system for producing a personalized financial transaction card. The system comprises: an interface for receiving from a secure environment a unique one-way code generated from customer account information; an image processor operable to manipulate an image in accordance with instructions from a remote terminal operated by said customer; a data store for storing the manipulated image in association with the one-way code; and an interface operable to supply said manipulated image for application to a financial transaction card responsive to a request comprising an identical one-way code generated independently from said customer account information. The customer account information may comprise at least a portion of an embossing record.

In accordance with any of the preceding embodiments, a kiosk accessible to consumers may be provided for performing manipulations to the graphical representation and/or for producing financial transaction cards applied with a personalized image.

In another embodiment according to the invention, there is disclosed a computer system for producing personalized financial transaction cards. The computer system comprises: means for generating a browser-based user interface for displaying on a remote terminal a graphical representation of at least a portion of an image, said interface being capable of effecting a plurality of manipulations to the graphical representation; an internet communications link coupling the remote user interface to an image processor, said link being operable to receive instructions defining said plurality of manipulations applied to the graphical representation from the remote terminal; an image processor operable to access the image to apply manipulations emulating those applied to the graphical representation according to the instructions; and financial transaction card production equipment operable to apply the resulting image to a financial transaction card.

In a further embodiment according to the invention, there is disclosed a method of operating a computer system to produce a personalized financial transaction card. The method comprises: receiving encrypted customer information generated within a secure environment from information relating to an account of the customer; receiving at an image processor an image, and manipulating the image in accordance with instructions from a remote terminal operated by said customer; storing the manipulated image in association with the encrypted customer information; and providing said manipulated image for application to a financial transaction card, in association with the encrypted customer information, to an entity having an encryption key capable of decrypting the encrypted customer information.

In another embodiment according to the invention, there is disclosed a method of operating a computer to facilitate production of a personalized financial transaction card. The method comprises: providing means for presenting to a remote customer a user interface; receiving instructions for manipulation of an image file, the instructions being based on manipulations performed by the remote customer with regard to a representative version, on the user interface, of the image that is contained in the file; and providing an image, produced based on said instructions for manipulation, for application to the financial transaction card, the image being associated with a customer identifier corresponding to the remote customer.

In further related embodiments, the customer identifier may comprise one of: a one-way code, a unique customer identifier, and encrypted customer information. The one-way code may be created by a card issuer applying a one-way code function to financial account information of the remote customer. The encrypted customer information may be encrypted by a card issuer encrypting financial account information of the remote customer. Providing the means for presenting the user interface may comprise operating a website server. The provided image for application to the financial transaction card may be provided to a card bureau. The customer identifier may be embedded in the image produced based on said instructions for manipulation; including by being embedded as a machine-readable code, as a bar code, or by being embedded in file metadata. In one embodiment, the image file is not transferred to the user interface.

In another embodiment according to the invention, there is disclosed a system for operating a computer to facilitate production of a personalized financial transaction card. The system comprises: computer program means for presenting to a remote customer a user interface; image instruction means for receiving instructions for manipulation of an image file, the instructions being based on manipulations performed by the remote customer with regard to a representative version, on the user interface, of the image that is contained in the file; and image processing means for providing an image, produced based on said instructions for manipulation, for application to the financial transaction card, the image being associated with a customer identifier corresponding to the remote customer.

In further related embodiments, the customer identifier may comprise one of: a one-way code, a unique customer identifier, and encrypted customer information. The customer identifier may comprise a one-way code created by a one-way code function applied to financial account information of the remote customer. The customer identifier may also comprise encrypted customer information created from encrypted financial account information of the remote customer. The computer program means may comprise a web server application of a website server. The image processing means may comprise means for providing the image for application to the financial transaction card, to a card bureau. The image processing means may also comprise means for embedding the customer identifier in the image produced based on said instructions for manipulation; such as by using means for embedding the customer identifier as a machine-readable code, as a bar code, or as file metadata.

BRIEF DESCRIPTION OF THE DRAWINGS

For a better understanding of the present invention, and to show how the same may be carried into effect, reference will now be made, by way of example only, to the accompanying drawings, in which.

DETAILED DESCRIPTION

Figure 1:
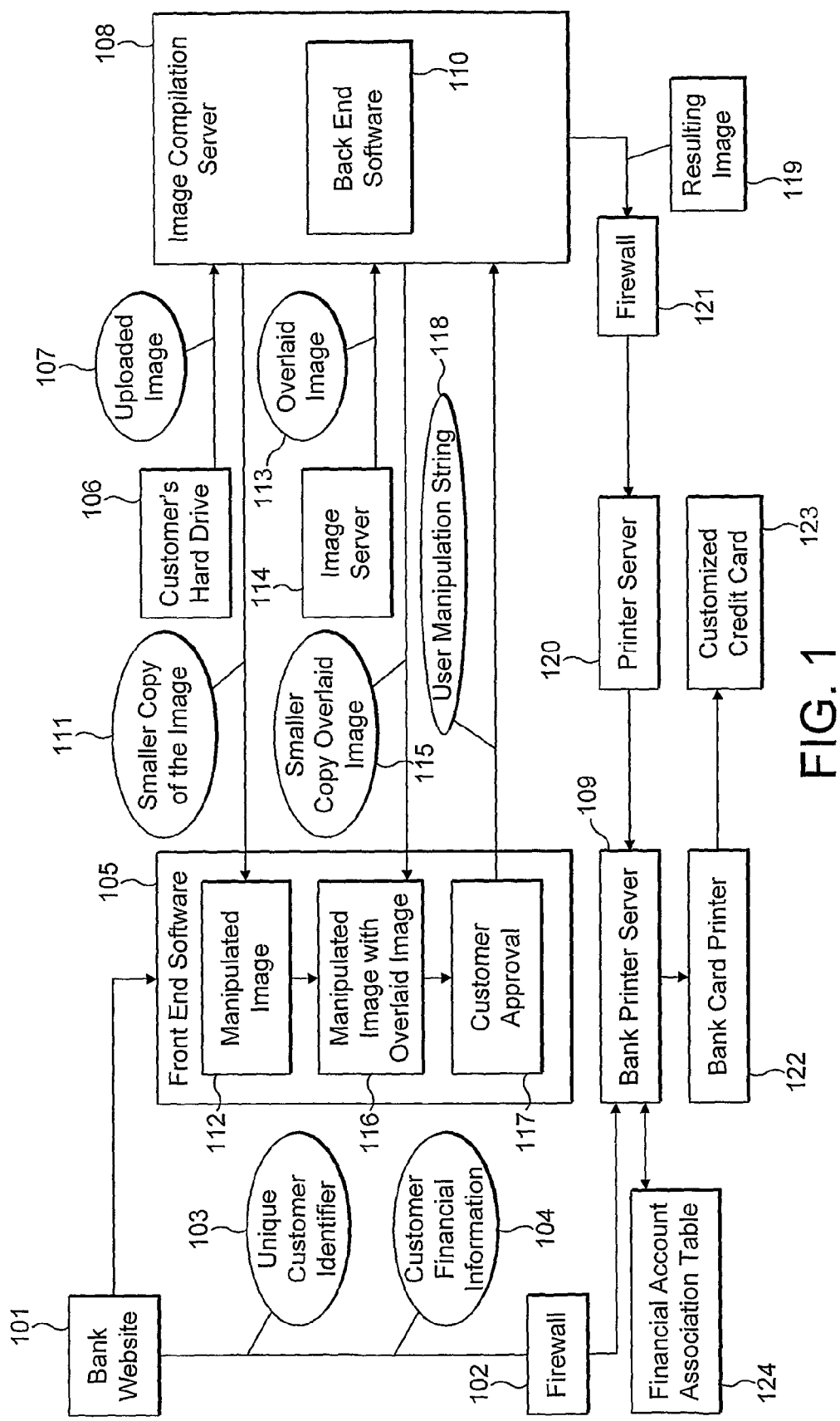
FIG. 1 illustrates a computer system for remote manipulation of images, in accordance with an embodiment of the present invention.

An embodiment according to the invention allows a user to manipulate an image through a browser interface, and is divided into two software portions, here referred to as front end software and back end software.

The front end software operates entirely within an Internet browser and in most cases does not require a download, because it accepts the limitations of the browser. In one embodiment, the front end software runs Flash software, available from Macromedia Inc. of 600 Townsend Street, San Francisco, Calif. 94103, U.S.A., or equivalent software. The front end software is a pure Graphical User Interface (GUI), and allows a user to design and edit graphics on his or her screen in order to build a representation of a desired image. Representations of stock (starting) images can be presented to a user in an on-screen image library and/or created by the user on demand. The image desired for output can be made up from one or several representative components, each of which has its position defined relative to an origin, and can be manipulated based on a set of predetermined rules—such as, for example, rules allowing the image or its components to be resized, rotated, flipped, mirrored and moved relative to other components. The representative graphical components can be used, for example, to build relatively complex designs consisting of a plurality of different layers and/or transparencies constructed using Flash scenes.

When the design is completed, in an embodiment according to the invention, instructions about what the final image looks like are sent to the back end software, which runs on a server. In the preferred embodiment, these instructions are sent together (simultaneously) after the manipulation is completed, and take the form of a text string for each component of the image. For example, the text string makeimage.aspx for a graphics component might read:

id+=030, x=182, y=32.3, flip=yes, rotate=270, scale=190.6, user=230 where id is an image identifier; x and y define the position of a component relative to a predetermined origin; flip, rotate, and scale define manipulations of types generally well known in the art; and user is a number identifying the user. Those of skill in the art will appreciate that a range of image manipulations can be defined in this way. A resulting image may be represented by one or a number of graphical components. It is thus possible for a plurality of text strings, or an extended text string, to define an image made of a plurality of separate graphical components. The graphical components used, for example, in Flash movie scenes are generated and manipulated with a minimum of computing resources; and the designs constructed as a result can be recreated on the back end (server) side using the relevant (and generally much larger) image files. Relatively complex designs can be achieved by employing two or more image components with separate image identifiers. The image identifiers for graphical components of the same image may have a common characteristic. In accordance with embodiments of the invention, the instructions included in the text string that defines the manipulations needed to create the resultant image, need not all be included in a single text string; instead, a series of text strings may be transmitted separately to convey the same plurality of instructions. Furthermore, manipulations on the remote server need not await receipt of all of the series of text strings, but can instead be performed in stages as each string of the series is received. Regardless of the number of text strings used, an advantage of an embodiment according to the invention is that a smaller, emulated version of the image can be manipulated by the user with a minimum of computing resources, and instructions can be transferred efficiently as text strings; instead of requiring the inefficient (and time-consuming) transfer of large image files, or portions thereof, between the customer and an image-production server. Further, the need to make calls to a server with an image change each time that a single manipulation is made, is also overcome.

The back end software is responsible for generating the final image, in accordance with an embodiment of the invention, by interpreting the manipulations applied to the representation (defined in the, or each, text string file) and applying corresponding manipulations to one or more stock images held in a remote image store. The images used in the front end software are less computationally-demanding representations of those held on the server. As a result, the back end software can make image transformations that exactly mirror those which are seen on the client machine. Once the desired image has been created by the back end software, the image can be output to whatever device is required, such as a device for printing the image onto a personalized consumer item. In this way, the graphical representation is displayed and manipulated at the user interface by means of the Flash software, and only a minimal amount of information concerning the image and manipulations applied thereto need be transferred to the remote image processor.

As mentioned above, the front end software may use Macromedia's Flash, or another product. For example, the software could instead use HTML and Javascript (DHTML) without a download, although the GUI is relatively poor. Use of Flash (or equivalent) software is advantageous in that it does not allow full access to a user's local files, so that it does not risk transmitting computer viruses to the user's machine. Use of Flash software also does not require a user to install software other than the Flash plug-in, which has a high penetration of the browser market.

The preferred embodiment thus allows for on-line image manipulation by emulating the browser-based transformations (such as re-sizing or overlaying images), made by the user on a representation of the image, on the server so that the images produced can be used for personalized product creation.

On-line image manipulation is allowed by creating a two-tier architecture, in an embodiment according to the invention: there is one program that allows image manipulation on the screen in front of a user; and a second program on a server that emulates these manipulations, so that the images can be output for personalized product creation. In the preferred embodiment, the back end process, or elements of it, can be performed in a secure computing environment; and customized images can be printed onto an actual product under very high security (for example, bank level security). In this way, a user with internet access can design customized images for printing on a remote product which requires secure treatment, such as bank level security. For example, anti-fraud and anti-theft measures mean that the production of credit cards, and other types of transaction cards, is performed in secure locations. Customization of the designs applied to such cards is thus possible, using preferred embodiments, without the need to give the user direct computing access to the secure environment.

An online image-editing tool uses the browser environment of HTML and Macromedia Flash as a Graphical User Interface for remote software that emulates the actions taken on the client machine, in an embodiment according to the invention. This enables a fast experience for the user and a high quality end product. However, the browser-based, client-side environment allowing manipulation by the user need not necessarily be Flash from Macromedia Any equivalent software tool capable of providing the required functionality could be used—for example, any tool capable of generating a representation of an image, applying manipulations thereto, and transferring the results through a set of commands to the server-side software, such that an image processor on the server side can emulate the actions of the front end and create a result image that can be saved to the server. The front end software will allow the upload of images from the user's computer to the server, so that the user's own images can be manipulated and overlaid with "stock" images and borders. Then, by communicating with the back end software, it is possible to produce personalized goods for a user. Such personalized goods may include, for example, credit cards, debit cards, mobile phone covers, mugs, T-shirts, gift cards, and framed prints.

An embodiment according to the invention has the advantage that high quality images do not need to be uploaded to the customer's browser during the manipulation process, because lightweight, web-enabled formats are instead used for the user's experience, thereby making the system fast and easy to use. However, when the information is transferred, the original high quality images are used to give high quality print results. An embodiment according to the invention also allows the provision of light-weight but fast graphics manipulation, without the complication of downloading programs. Additionally, a user interface according to the invention is not constantly calling to the server; thus the interface is quick and pleasant to use, and Internet bandwidth is used efficiently. As another advantage of an embodiment of the invention, the original image is not transferred over the internet at the manipulation stage, so that the possibilities for hacking the image are greatly reduced. Also, because the interface runs within the Macromedia Flash environment, the interface is platform independent. Further, because the final image may be created on a server controlled by a single company, the final image output may be made to have a standardized size and resolution. This enables easy integration with printers, simplifies the production of a personalized product, and simplifies billing on a per-image basis.

Figure 2:
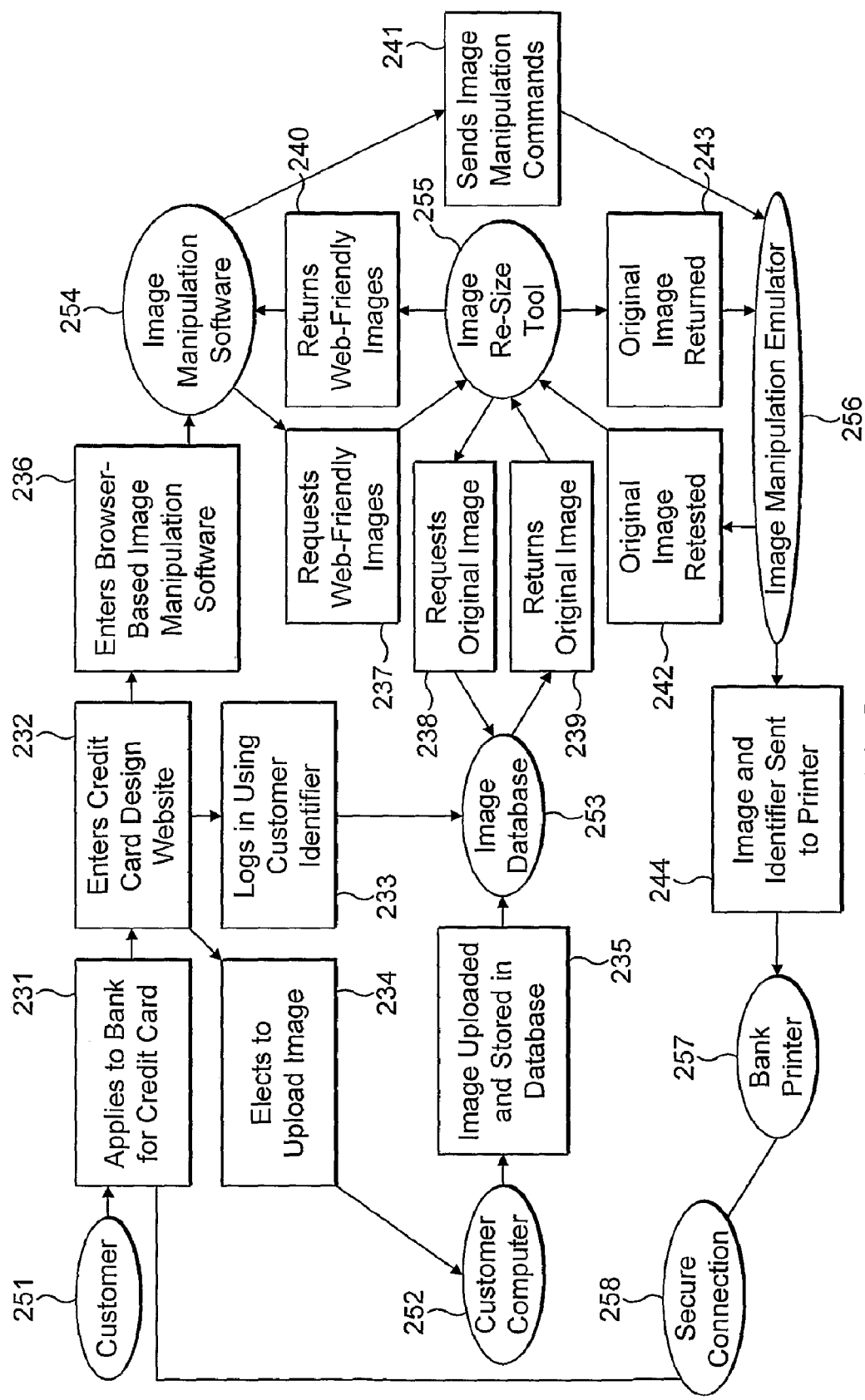
FIG. 2 illustrates a method of operating a computer system for remote manipulation of images, in accordance with an embodiment of the present invention.

By way of example, FIGS. 1 and 2 describe the production of a credit card, in accordance with an embodiment of the invention.

In the embodiment of FIG. 1, a customer accesses software according to the invention, after having applied for a credit card through a web site 101 of a card issuer (such as a bank). In the first step, the card issuer issues the customer with a unique identifying number 103 which is passed to an image compilation server 108, which may (or may not) be operated by a company other than the card issuer. The card issuer associates the unique customer identifier 103 with the customer's financial information 104. This association may be performed in a financial account association table 124 maintained in an environment that is secure from the user interface. The associated customer identifier 103 and financial information 104 are passed to a bank (or other card issuer) printer server 109 via a firewall 102. Next, the customer enters the front end software 105, which may be operated by a website server or other front end server. The customer chooses an image 107—in FIG. 1, from the customer's computer hard drive 106, and uploads it to the image compilation server 108. The image 107 could come from any suitable source such as an image library maintained by an operator of the image compilation server 108. Back end software 110, running on the image compilation server 108, now enters the original image into a database and generates a web-friendly smaller copy 111 to send to the front end software 105. The customer now performs image manipulations 112 (such as resizing, rotating, and placing the image), as the customer desires. The back end software 110 associates the customer image selection, and subsequent manipulations and selections, with the unique customer identifier 103. Next, the customer chooses another image 113 to overlay on top of the first image 107, and positions image 113 as desired. The overlay image 113 may, for example, be a transparent decorative frame for the uploaded image 107, and may be maintained in an image server 114. The back end software 110 transmits a web-friendly, smaller version 115 of the overlay image 113 to the customer, for use in a creating a combination 116 of the original manipulated image 107 with the overlay image 113. Once customer approval 117 of the final design 116 is achieved and indicated to the front end software 105, the front end software 105 transmits a string of user manipulation data 118 to the image compilation server 108. This string 118 encapsulates the customer's image selections and manipulations. On receiving this string 118 the back end software 110 accesses the original copies of the images from an image library and performs the exact operations that the customer has chosen in the front end software 105 for the customer's final design. In this way, the back end software 110 emulates the manipulations at the user end according to the information transferred in the text string (also referred to herein as the results script). At this point the back end software 110 can output the resulting image 119 to a printer server 120, which may be performed through a firewall 121. The resulting image 119 and associated customer identifier 103 may then be passed to the bank (or other card issuer) printer server 109, which in turn accesses the financial account association table 124 to obtain the associated secure customer financial information 104. The financial information 104 and resulting image 119 may then be sent to a credit card printer 122, which prints a customized credit card 123. All of the images that are used by the customer in the front end software 105 are issued via the back end software 110. The only information which passes to the back end software 110 from the front end software 105 (apart for requests for images) is data about how the image in front of the customer appears. This information can easily be encrypted for increased security. The number of images combined in a design is not limited to one or two (such as images 107 and 113)—the script can be easily amended for many more layers. Also, transparent frame image layers need not be selected and manipulated before a non-transparent image layer; the image layers can be designed in any order. Text can also be added to the image through a similar replication. The output image can be sent to any type of machine and thus the possible applications are very wide-ranging: the software can be applied not only to the payment card market, but also for non-payment and telephone cards. In certain embodiments, layers may be employed as templates and/or marks, referred to herein as transparencies. In one embodiment, the final image displayed on a card may be restricted to a selected pre-defined area, such as a "window" on a payment card (or other financial account access means), leaving the rest of the card free to contain functional features of the card, such as a bank logo, a payment card hologram or type indicator (such as, for example, "Visa" or "MasterCard" logos). Alternatively, some image layers may be positioned within such a selected window on the card; while other image layers (such as transparencies) are positioned outside the selected window, but surrounding the functional features of the card (such as the bank logo, payment card hologram, etc.). Also, the bank logo or other financial feature can act as a fixed template, behind which the user can move the image to a desired position.

In the embodiment of FIG. 2, in a first step 231, a customer 251 has applied to a bank (or other card issuer) online for a credit card, or is an existing customer offered the opportunity to make a new card for an existing account. In step 232, the customer clicks a link redirecting the user to a website (which may be operated by a company other than the card issuer) for designing the credit card—arriving with a unique identifier which relates to the customer's account and which will be carried with the customer throughout the customer's time on the site. In step 233, the customer identifier is used to log-in; alternatively, the customer could log-in separately at this point and recollect the customer's identifier. Since the design website uses only the customer identifier to identify the customer, it does not obtain any of the customer's financial details. In step 234, the customer elects to upload an image from the customer's own computer 252, such as a scanned or photographed image. In step 235, the image is uploaded to an image server, and may be held in a database 253 for convenience. In step 236, the customer enters browser-based image manipulation software 254. In step 237, the image manipulation software requests a series of images in web-friendly formats from an image re-size tool 255, so that the process is fast and quick to use. In step 238, the image re-sizing tool requests the original image from the database 253; in step 239, the original image is returned and re-sized to a web-friendly format and size; and in step 240, a set of web-friendly images is returned to the image manipulation software 254 (these are graphical representations of the original images on which manipulations can be performed). Once the customer has achieved the desired effect by manipulating the series of images required, the associated image manipulation commands are sent 241 to an image manipulation emulator 256. Image manipulation commands can include, for example, rotating, re-sizing, positioning, flipping, scaling, brightness controls, red-eye reduction, opacity levels, and other manipulations. In step 242, the image manipulation emulator 256 then requests the original images from the image server so that the best quality image is used. Upon receiving the images in step 243, the emulator 256 then repeats the completed transformations of the customer and creates an image that emulates the one created online, but that uses the original, higher quality graphics. In step 244, this image, and the associated customer identifier, is sent to the bank's printer 257. The financial data corresponding to the customer identifier is obtained, via a secure connection 258 to the bank (or other card issuer); and the printing process set in motion.

In an embodiment according to the invention that places personalized images onto plastic, credit card-style cards, it is necessary to ensure a very high level of security. Therefore, in circumstances where there are already financial records in place for the user, the architecture receives a unique non-sequential customer identifier, which matches with a set of financial records, from the credit card issuer. This customer identifier is passed through each element of the system and is returned with the generated image file. Thus in a "mail merge"-type operation, the customer's personalized image can be matched up with the customer's financial and personal records, so that the correct image is placed on the card. At no time does either the front end or back end software have any financial information. The customer identifier may be used in an automated log-in process. In this way, the software (both the front end and back end software) can know whether the user is new or not. A returning visitor can thus be presented with images that were uploaded on a previous visit.

The system's architecture comprises two distinct elements, in an embodiment according to the invention. The front end element, the element that the user interacts with, is built in Macromedia Flash. This element allows the user to design a card by manipulating (through scaling, rotating, or performing other manipulations such as those given above) the image uploaded and then overlaying the image with frames that can contain transparent sections. Since Flash does not have "local permissions" on the client machine, as it is a browser-based interface, it is not capable of saving the final design. It therefore sends a string of instructions to the second, serverside element. The second, serverside element may be written in C#, although Java, C, C++, or any other suitable language would be equally capable. The string of instructions may be sent as a "querystring," i.e. as part of the URL; for example, the string could be formatted as:

(createpage.aspx?here_are_the_string_of_instructions&rotate=90&flip-=yes . . . )

Other methods may also be used for transmitting the user's design manipulations, such as using an HTML style "form," or writing the information to a Cookie and then re-reading the information. Alternatively, the hypertext transfer protocol commands HTTP "POST" and HTTP "GET" may be used to pass data from the user session to the server. HTTP "POST" works in an identical fashion to a standard website form; while HTTP "GET" works by changing the URL. For example, an HTTP "GET" could change a URL, in order to transfer a user's rotation, scaling, and other selections, to read:

http://www.personalcard.net/
saveinfo.aspx?rotate=90&flip=no&scale=2-
32&x=232&y=12&y2=343&x2=333 etc.

This list of techniques for transmitting the manipulation results is not intended to be exhaustive. Alternatives and future developed techniques will also be suitable.

The customer identifier may be passed using Session State (the webserver's Session Object) or by passing as part of the "querystring," in accordance with an embodiment of the invention. HTML "forms" could achieve the same ends.

In accordance with an embodiment of the invention, an image can be uploaded as a JPEG, GIF, BitMap, PNG, Tiff etc.; although it will be appreciated that nearly any digital image can be uploaded or output. From the original uploaded image the system creates four separate versions:

1. A thumbnail version (as a JPEG)—see the interface screenshots, below. The image is approximately 1 to 2 k in file size.

2. A larger, but still web-optimized version (this is scaled to allow the image to be expanded to the maximum available by the interface—such as scaling 250%—and still have one-to-one pixel matching (i.e. the image size is width 241.times.250% if possible). This is the image used on screen for the design of the card.

3. A Bitmap image at the same scale as the original image. A Bitmap image may be used, for example, in a system that uses C#, which is a Microsoft language and uses Bitmap as the default image type.

4. The output design, which may be sized in proportion to a credit card. This design could be of any software format that is useful to the printer used, such as BMP (Bitmap) or PNG (Portable Network Graphic).

The original images may be placed into a database once they have been uploaded. In one embodiment, each request for images requires going back to the original version to use; however, this need not be the case, because once another image version has been created (e.g. a thumbnail version), the system can equally store this version so that the processing is reduced (though memory taken would increase). A key benefit of an embodiment according to the invention is that it is not necessary to pass the largest image backwards and forwards across the web from client to server, except for the initial upload of images. Nonetheless, when the final edited design or image is generated, the highest quality image is used.

In an embodiment according to the invention, the user designs, on screen, an image that appears the same physical size as a credit card using the screen resolution of 72 dpi. This is because a computer monitor cannot present images at a higher resolution than this. However, a printer can output at higher resolutions, typically 300 dpi or greater—increasing the quality. Although the front end software uses the low resolution images, the final design is compiled by the back end software using a full scale, bitmap version of the original image uploaded. This may be achieved by using a "virtual canvas" within the back end software that is larger than the design canvas within the front end software. Thus the design being created by the back end software is laid on to a background of greater size than in the front end software (while maintaining 72 dpi resolution). Thus, if the credit card size in pixels is 241 by 153 then, by laying the image on a "vial canvas" credit card of, 1050 by 672 at 72 dpi, the resolution can be increased to approximately 300 dpi when the credit card is finally printed (back at 3.3 inch by 2.1 inch). This method ensures that the maximum dpi achievable (to the printer's maximum setting) is output from the back end software, but only the resolution necessary is sent to the front end software. This reduces the memory requirements of the client machine and the Internet traffic. This operation could equally be achieved by changing the resolution of a 72 dpi image to 300 at the original size.

In order to use transparencies, in an embodiment according to the invention, the images containing a transparent layer (usually frames or borders) must be converted into Flash "movies" themselves. This process can be manual, but can also be automated to allow images with transparencies (such as bitmaps or PNG) to be imported into the front end software "on the fly." The back end software can use the original PNG or BMP image to generate the credit card image.

Figure 3:
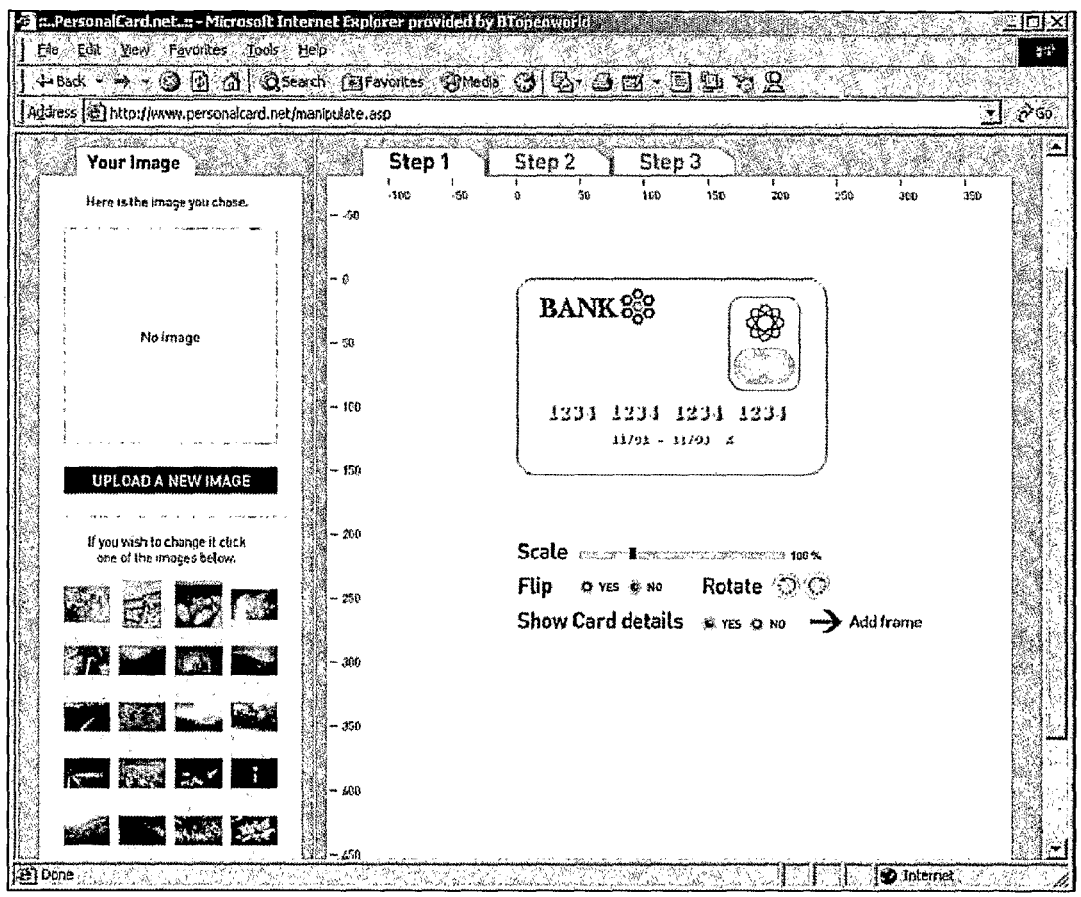
FIGS. 3-10 show screens of a credit card design website, operated in accordance with an embodiment of the invention.
Figure 4:
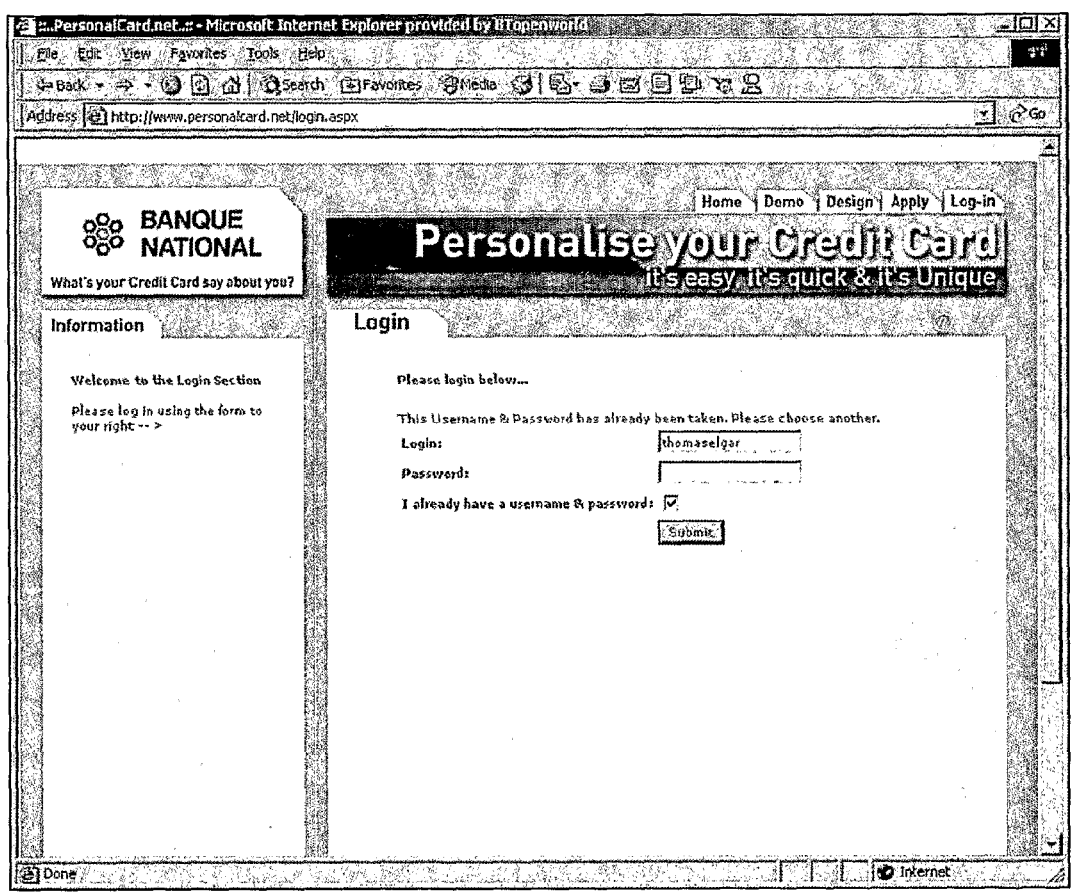
Figure 5:
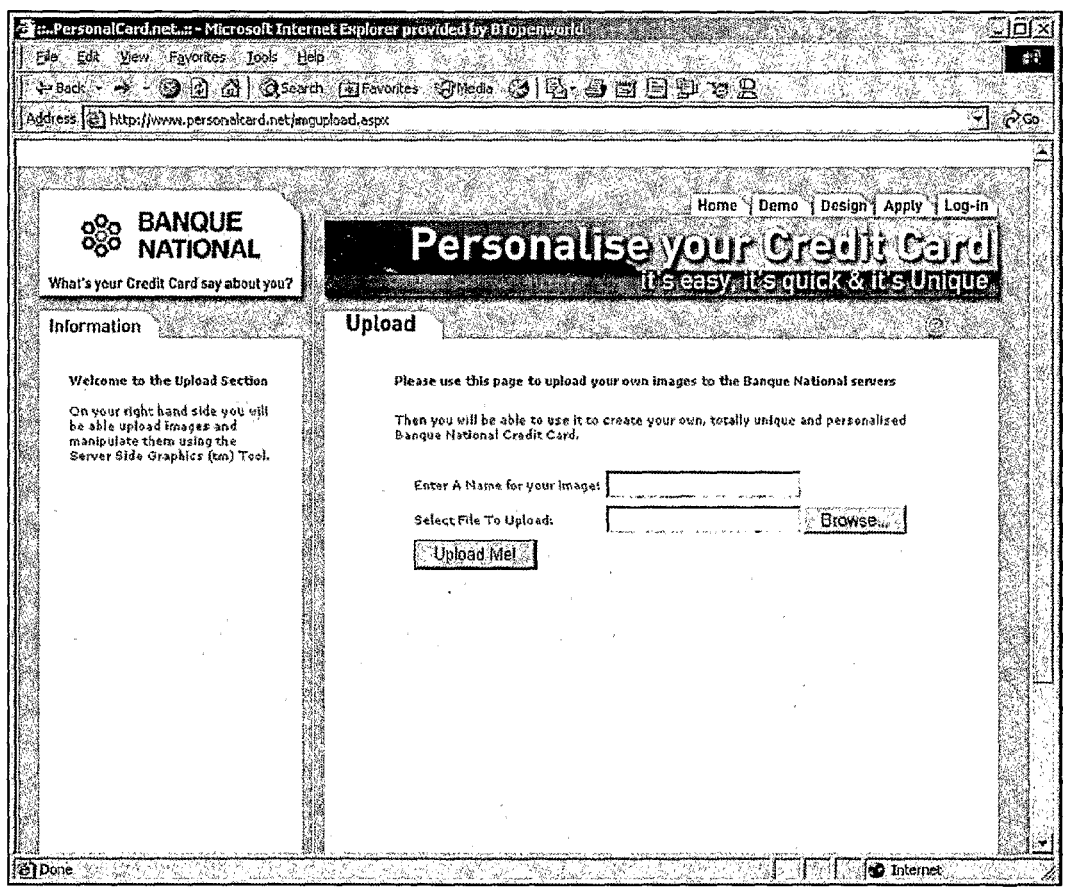

FIGS. 3-10 show screens of a credit card design website operated in a series of steps according to an embodiment of the invention. FIG. 3 shows a first screen, with a standard library of images assigned to the particular card issuer that is using the credit card design website, on the left of the screen. FIG. 4 shows a screen allowing users to log in so that they can load new images in to the left hand side library. This can be automated in live versions. In FIG. 5, the upload allows the user to browse his or her own computer for images to upload.

Figure 6:
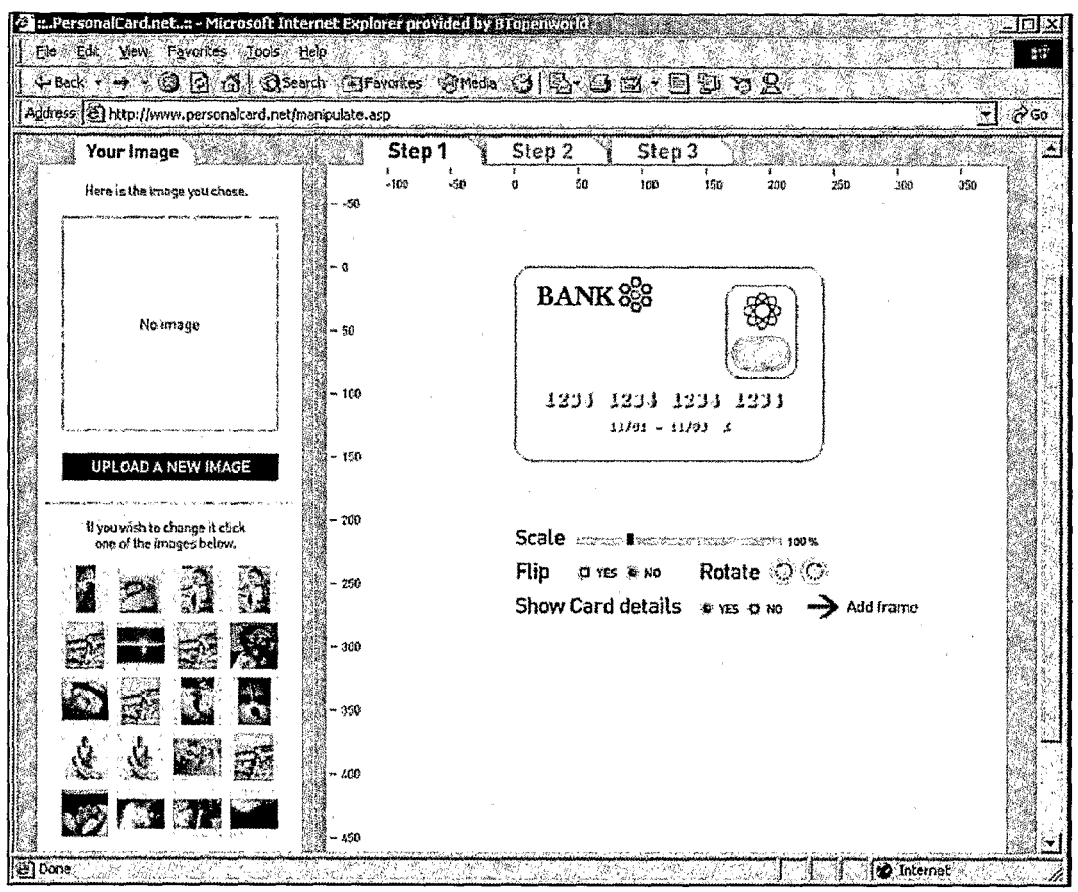
Figure 7:
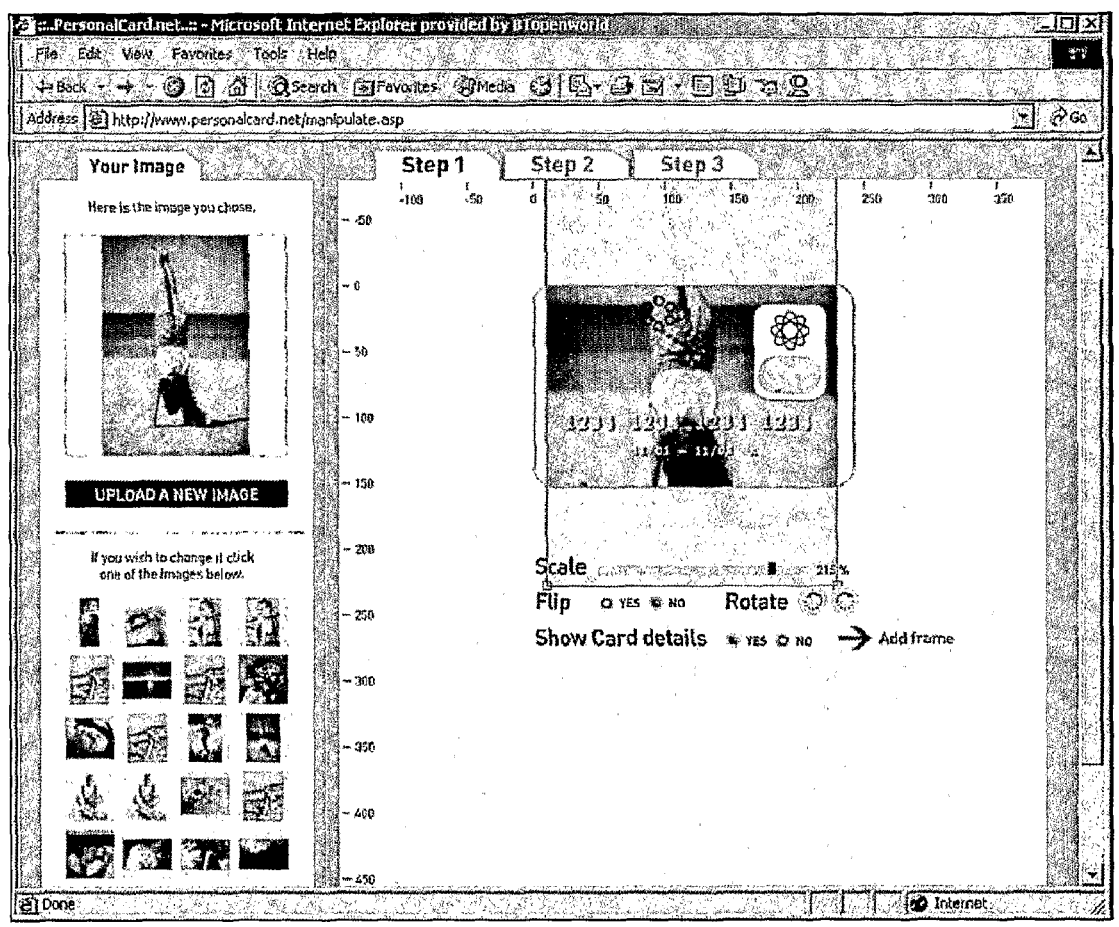
Figure 8:
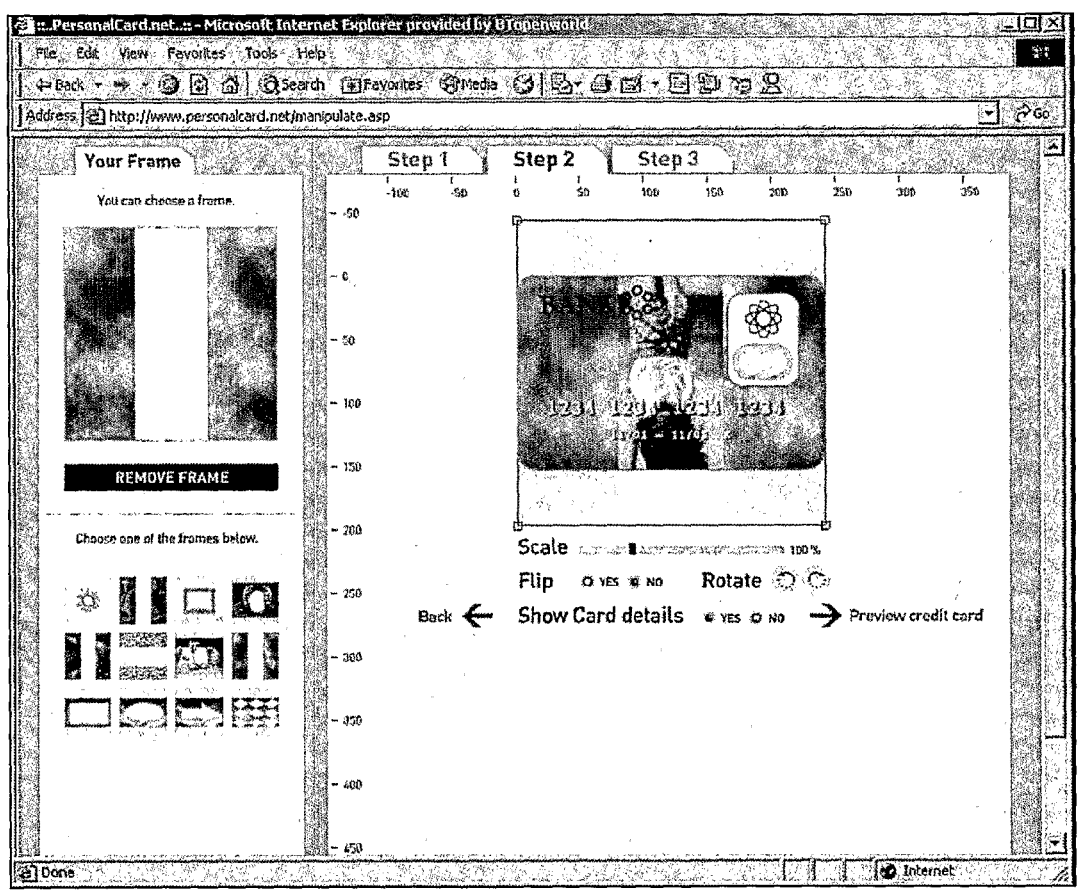
Figure 9:
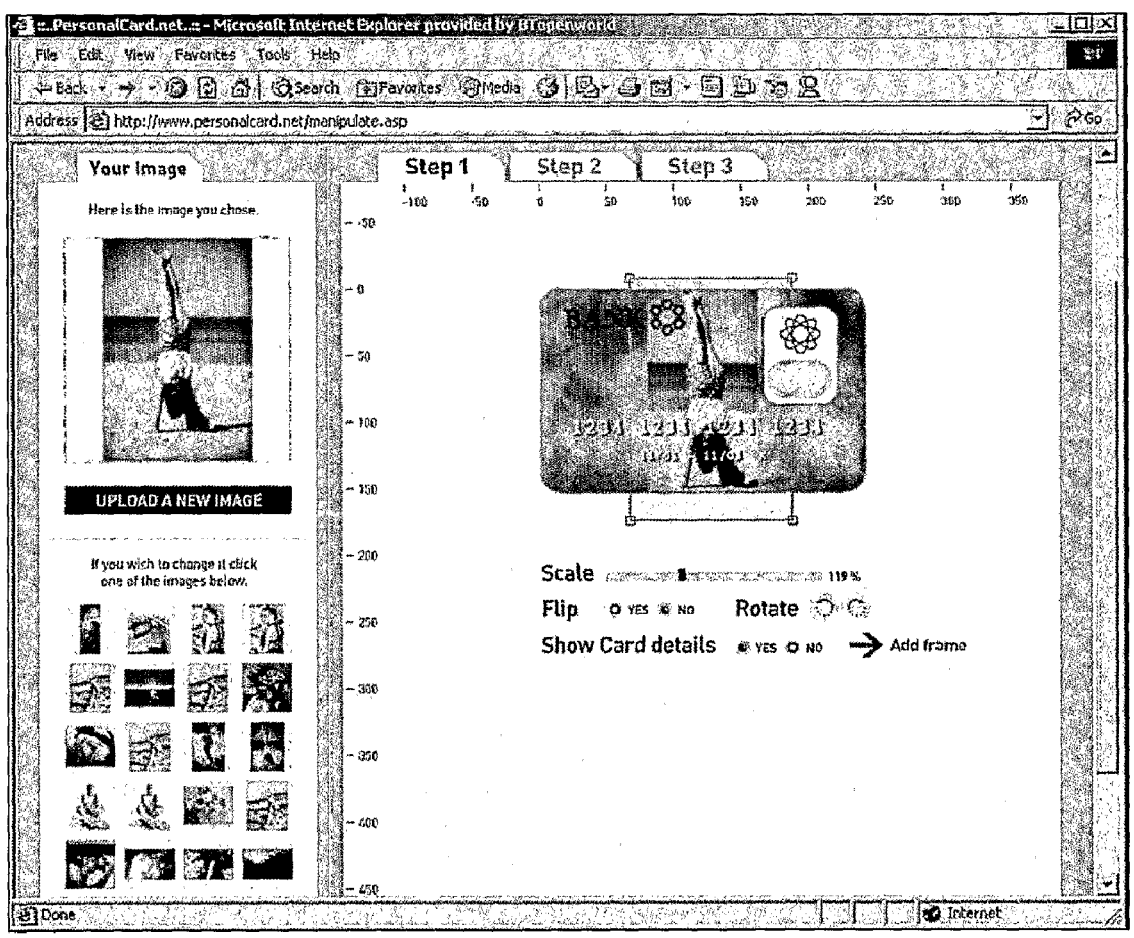
Figure 10:
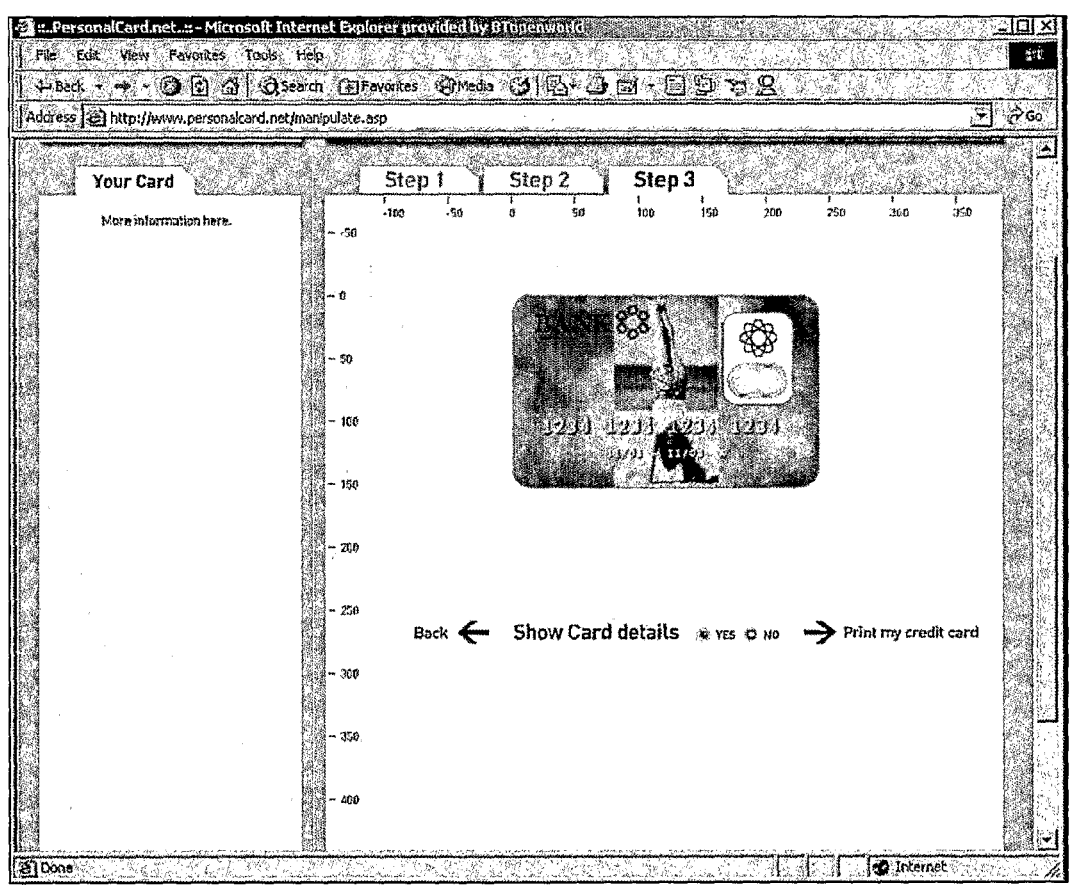

FIG. 6 shows a screen with a new library including both the user's images and a set of stock images. In the screen of FIG. 7, by clicking on the thumbnail image on the left hand side, the bigger but still web-optimized image is loaded. At this point it can be scaled, flipped, rotated, or undergo other manipulations; and the card details can be viewed or hidden. In the screen of FIG. 8, frames can then be added. These are Flash (.swf) files that allow transparencies. Again they can be flipped, scaled, rotated, or undergo other manipulations; and the card details can be hidden. In the screen of FIG. 9, by clicking on the red Back Button or on the Step 1 tab, the user can return to a previous screen. At this point the image is shown as "live" but the frame can be seen as well. The screen of FIG. 10 shows the final version of the credit card before it is sent off to the back end software to be created.

Figure 12:
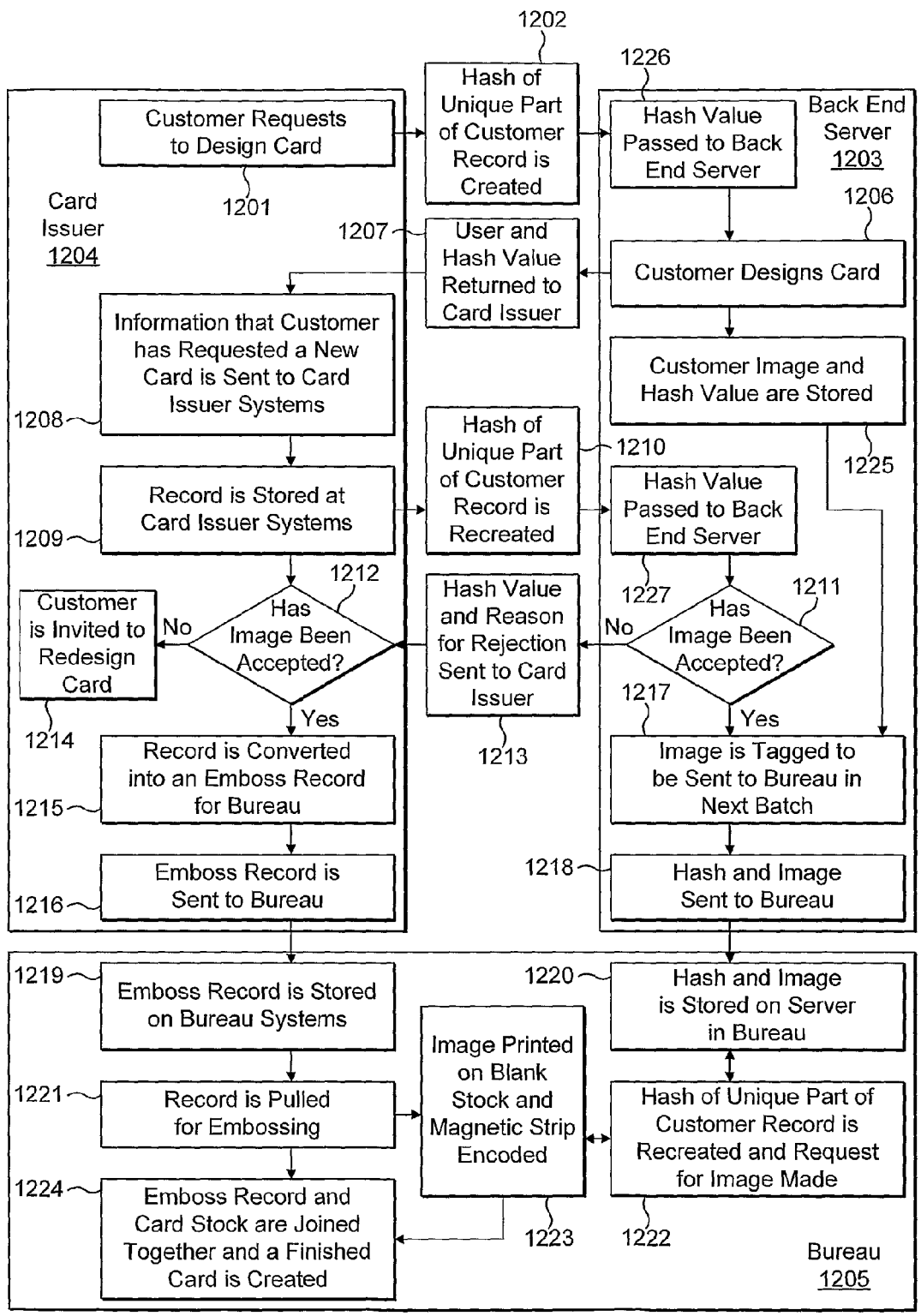
FIG. 12 illustrates a method of operating a computer system for remote manipulation of images, using a hash value to avoid the need for creating and maintaining a unique customer identifier through the card application and printing lifecycle, in accordance with an embodiment of the present invention.

In accordance with a further embodiment of the invention, shown in FIG. 12, a bank or other card issuer need not create a unique identifier for a customer, and pass that identifier through the card issuer's own system. Given the complexity of banking systems, avoiding the need to create such an identifier can be an advantage.

Figure 11:
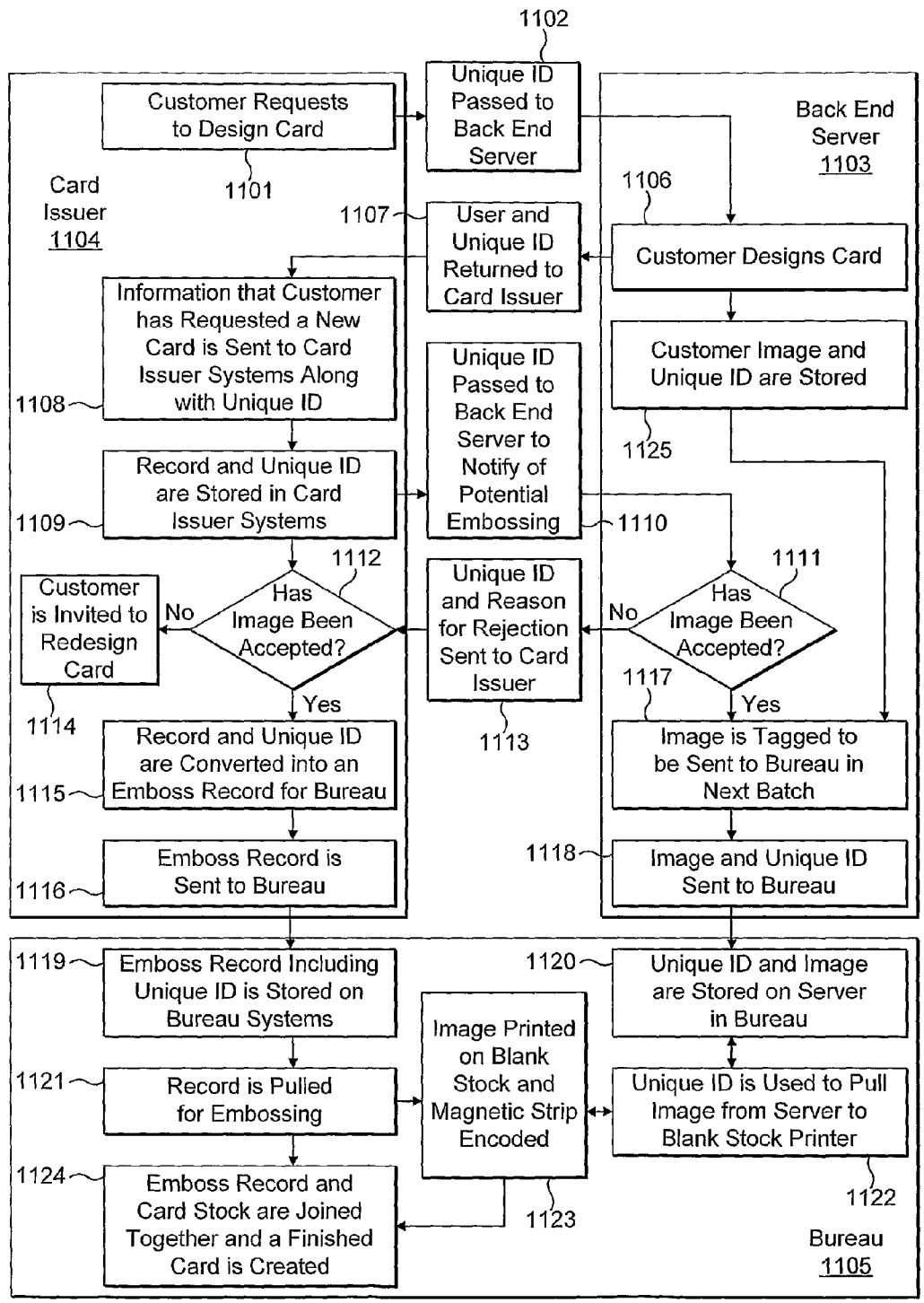
FIG. 11 illustrates a method of operating a computer system for remote manipulation of images, using a unique customer identifier, in accordance with an embodiment of the present invention.

Before illustrating the alternative of FIG. 12, FIG. 11 first illustrates an embodiment that may be useful for some card issuers, in which a unique identifier is created for each customer. In this embodiment, a unique identifier is created for each customer that requests to design a card 1101, and passed 1102 to the back end server 1103. The back end server 1103 creates an image corresponding to the customer's unique identifier; and the card issuer 1104 passes the unique identifier through the card issuer's own system. A bureau 1105 that creates the final card can then make a software call to the back end server 1103 using the unique identifier, so that the account details received from the card issuer 1104 may be associated with the image.

In further detail, the embodiment of FIG. 11 functions as follows. Upon a customer requesting to a card issuer 1104 to design a personalized card 1101, the card issuer 1104 creates a unique identifier and passes the identifier 1102 to the back end server 1103. Once the customer designs the card 1106, the user and corresponding unique identifier are returned 1107 to the card issuer, and the back end server stores 1125 the customer image and unique identifier. The information that the customer has requested a new card is then sent 1108 to the card issuer's systems, along with the unique identifier; and a record and unique identifier for the customer are stored 1109 in the card issuer's systems. The card issuer then passes 1110 the unique identifier to the back end server, to notify it that the new card will potentially be created and embossed. The back end server 1103 and/or card issuer 1104 can then perform an image checking procedure 1111 and 1112, to ensure that the image designed by the customer is acceptable for production. If the image fails the back end server's image checking 1111, the unique identifier and reason for the image's rejection is then sent to the card issuer 1113; and the customer is invited 1114 to redesign the card. Once the image has been accepted, the card issuer converts 1115 the customer's record and unique identifier into an emboss record, which is sent 1116 to the bureau 1105 that will be creating the card. The back end server tags the image 1117 to be sent to the bureau 1105 in the next batch of images; and, when a suitable number of images are ready, sends 1118 the image and associated unique identifier to the bureau 1105. The bureau 1105 next stores 1119 the customer's emboss record and unique identifier, obtained from the card issuer 1104; and also stores 1120 the unique identifier and image, obtained from the back end server 1103. Having done so, the bureau 1105 can now create the finished card, by first obtaining 1121 the customer's record provided by the card issuer 1104; and also using 1122 the unique identifier to obtain the associated customer image and provide it to a blank card stock printer. The blank stock printer may then print 1123 the image onto blank stock, and encode the card's magnetic strip. Based on information in the magnetic strip, the emboss record and printed card stock may then be joined together 1124 to create a finished card.

By contrast with the process of FIG. 11, the embodiment of FIG. 12 allows a card issuer to avoid the need to create for each customer a unique identifier that must be passed through the card issuer's system. Instead, the card issuer creates a "hash value," such as a message digest, or other one-way code, based on some account details for each individual, so that the card issuer can pass customers' account information to the back end server in a way that is completely safe. Referring to FIG. 12, the process is similar to that of FIG. 11, with a card issuer 1204, a back end server 1203, and bureau 1205 performing analogous steps (1201 and following) to those of FIG. 11 (1101 and following). However, a principal difference is found in steps 1202, 1207, 1210, 1213, 1226, and 1227 of FIG. 12, in which a "hash value" (or other one-way code) is passed between the card issuer 1204 and the back end server 1203, instead of requiring the card issuer to create a unique identifier for each customer, as in FIG. 11. First, in step 1202, a hash of a unique part of the customer record (such as the customer's name) is created. A one-way hash, such as the MD5 hash, is a process that takes arbitrary-sized input data (such as a customer's name and account number), and generates a fixed-size output, called a hash (or hash value). A hash has the following properties: (i) it should be computationally infeasible to find another input string that will generate the same hash value; and (ii) the hash does not reveal anything about the input that was used to generate it. This means that the hash function used in the embodiment of FIG. 12 allows the card issuer 1204 to pass at least some of a customer's account information to the back end server 1203 in a way that is completely secure. As seen in steps 1202, 1207, 1210, 1213, 1226, and 1227, a hash value may be passed back and forth between the card issuer 1204 and the back end server 1203, without the need for the card issuer 1204 to create a unique identifier and pass it through its system.

In further detail, the embodiment of FIG. 12 functions as follows. Upon a customer requesting to a card issuer 1204 to design a personalized card 1201, the card issuer 1204 creates a hash value of a unique part of the customer's record 1202 and passes the hash value 1226 to the back end server 1203. Once the customer designs the card 1206, the user and corresponding hash value are returned 1207 to the card issuer, and the back end server stores 1225 the customer image and hash value. The information that the customer has requested a new card is then sent 1208 to the card issuer's systems; and a record for the customer is stored 1209 in the card issuer's systems. The card issuer then recreates 1210 the hash value that is based on the unique part of the customer record, and passes it 1227 to the back end server 1203, to notify it that the new card will potentially be created and embossed. The back end server 1203 and/or card issuer 1204 can then perform an image checking procedure 1211 and 1212, to ensure that the image designed by the customer is acceptable for production. If the image fails the back end server's image checking 1211, the hash value and reason for the image's rejection is then sent to the card issuer 1213; and the customer is invited 1214 to redesign the card. Once the image has been accepted, the card issuer converts 1215 the customer's record into an emboss record, which is sent 1216 to the bureau 1205 that will be creating the card. The back end server tags the image 1217 to be sent to the bureau 1205 in the next batch of images; and, when a suitable number of images are ready, sends 1218 the image and associated hash value to the bureau 1205. The bureau 1205 next stores 1219 the customer's emboss record, obtained from the card issuer 1204; and also stores 1220 the hash value and image, obtained from the back end server 1203. Having done so, the bureau 1205 can now create the finished card, by first obtaining 1221 the customer's record provided by the card issuer 1204; and also using 1222 the hash value to obtain the associated customer image and provide it to a blank card stock printer. The blank stock printer may then print 1223 the image onto blank stock, and encode the card's magnetic strip. Based on information in the magnetic strip, the emboss record and printed card stock may then be joined together 1224 to create a finished card.

In an alternative to the embodiment of FIGS. 11 and 12, which utilize a unique identifier and a hash value, respectively, other methods of creating a secure user identifier may be used. For example, it is also possible for the user information to be encrypted at the card issuer at the beginning of the process, and decrypted at the card bureau using a Private/Public Key or a Private/Private Key encryption technology. This alternative works in a manner similar to the process described in FIG. 12, but with modified security measures; for example, the key must be held by the card bureau.

In another embodiment according to the invention, a secure identifier of the image that is produced based on the user's instructions, may be embedded in the image itself, or embedded as part of the data file in which the image is stored. For example, a hash key, encrypted identifier, or other secure identifier may be passed through the back end server (such as server 1103 or 1203) in association with the user's image manipulation instructions. At any point in the back end server process, such as when the image is produced for sending to a card bureau (such as card bureau 1205), the image then can be made to have the secure identifier embedded in it—such as by embedding a bar code or other machine-readable code, which encodes the secure identifier, placed in the image itself. In this way, the card bureau 1205 can read the bar code, or other embedded secure identifier, directly from the image itself; and need not acquire any information from the back end server 1203 except for the image itself, which includes the bar code. This embodiment finds particular use in the case where the card production process of the bureau 1205 involves using an image printer, which is not capable of separately storing or passing on the secure identifier. Thus, by using the embedded secure identifier, the image printer can effectively pass on the secure identifier as well as the image to the embossing stage, simply by passing on the printed image itself, which will include the bar code (or other embedded machine-readable identifier). The embossing stage can then involve reading the bar code (or other embedded machine-readable identifier) from the image, and looking up the associated emboss record for use in final card production. It should be noted that the image printing function of bureau 1205 need not be performed within a single organization or enterprise; for example, the image printing may instead be performed by a separate enterprise or department from the organization that performs the embossing, in accordance with an embodiment of the invention. It will be appreciated that a variety of different techniques can be used for embedding the secure identifier in the image, such as by including the identifier in the metadata of the image file; including both when the image file is transmitted to the bureau 1205, or when the image file is in use by the back end server or the bureau.

Figure 13:
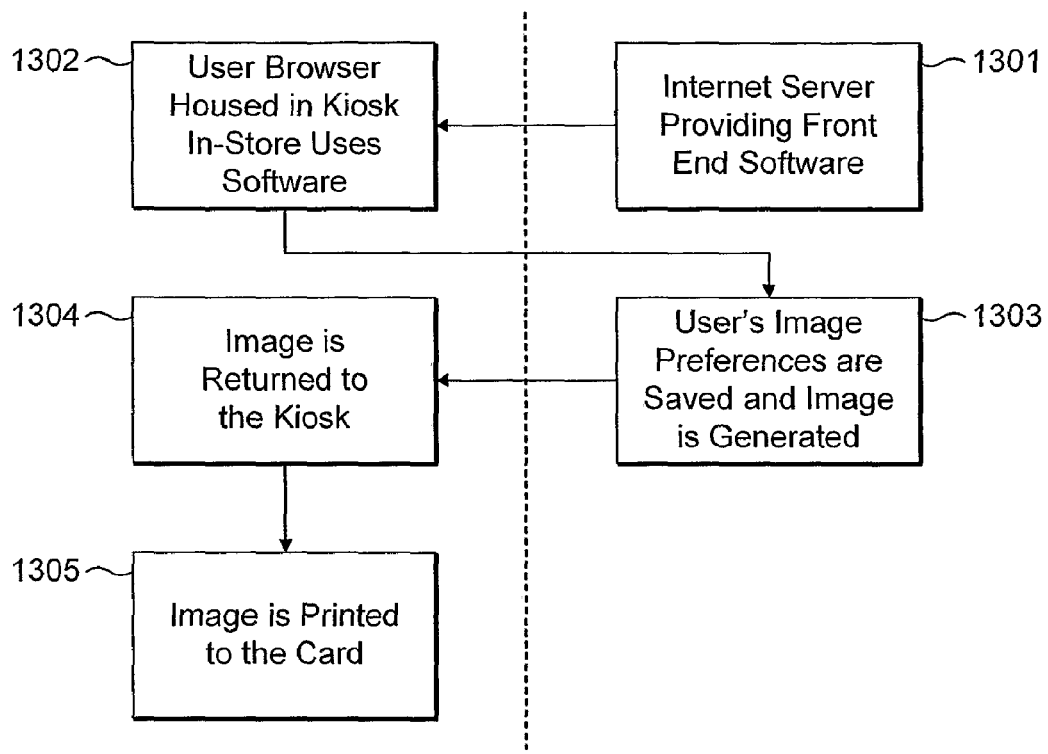
FIG. 13 illustrates a system according to an embodiment of the invention, in which an image is designed using a card-issuing kiosk or in-store instant issue system.

In another embodiment according to the invention, shown in FIG. 13, a modified architecture may be used, in the context of a card-issuing kiosk or in-store "instant issue" system. As with embodiments described above, front end software runs on a client-side browser; and back end software runs on a remote webserver. However, unlike in the above embodiments, the card printer is located on the client machine (such as a card-issuing kiosk). With reference to FIG. 13, a user browser housed in an in-store kiosk 1302 uses the front end software, which is provided from an internet server 1301, to allow a customer to design a personalized card. The user's image preferences are then saved and the image is generated 1303 on the remote webserver. The image can then be returned to the kiosk 1304, and printed to the customer's card 1305. Images may be checked on the remote server side, to ensure that they are suitable for printing, in real time, if required. Otherwise the operation of the system may be similar to the embodiments described above.

Figure 14:
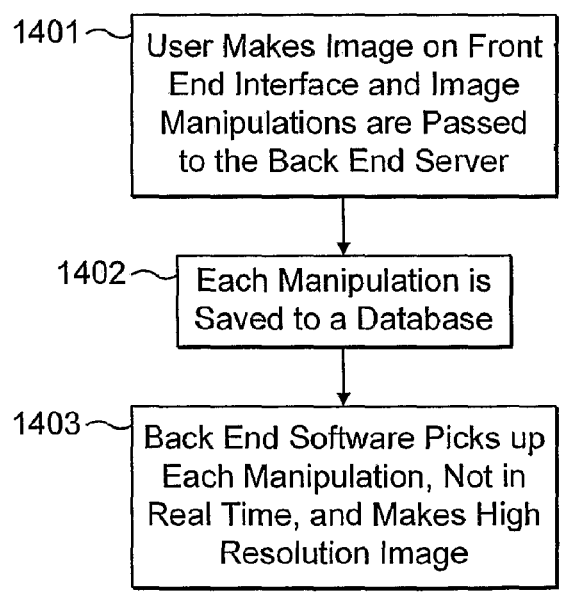
FIG. 14 illustrates a system in which a database is used to store information between a user's image selections and back end image production, in accordance with an embodiment of the invention.

In a further embodiment according to the invention, shown in FIG. 14, a database can be used to store information between the user's image selections, and the back end image production. In this way, the system can be made more scalable, since it does not need to create the images on the back end in real time. As with the other embodiments, the user first makes image selections on the front end interface software, and the image manipulations are passed to the back end server 1401. Then, however, each user's manipulations are saved to a database 1402; so that the back end software can pick up each manipulation, not in real time, and make the high resolution image 1403.

While the foregoing has described what are considered to be the best mode and, where appropriate, other modes of performing the invention, the invention should not be limited to specific apparatus configurations or method steps disclosed in this description of the preferred embodiment. Those skilled in the art will also recognize that the invention has a broad range of applications, and that the embodiments admit of a wide range of modifications without departing from the inventive concepts.

What is claimed is:

1. Computerized financial transaction card production equipment operable to apply one or more personalized images to a financial transaction card, the production equipment comprising:
    a module configured to receive a personalized image of a customer, the image being received from an image processor computer arranged to facilitate image personalization by remote customers;
    a module configured to receive a customer identifier that corresponds to the remote customer that personalized said image;
    a module configured to receive a financial record of the remote customer that personalized the image;
    a card printer arranged to print images on card material and equipment configured to apply financial information from the financial record to the card material; and
    a controller operable, based on said customer identifier, to cause printing of said personalized customer image onto the card material and to cause application of relevant financial information from the financial record onto the card material;
    wherein the customer identifier encompasses encrypted customer information.

2. Computerized financial transaction card production equipment as in claim 1, wherein said image processor computer is arranged to provide the personalized image in association with the relevant customer identifier, and wherein the module configured to receive the image is configured to also receive the associated customer identifier.

3. Computerized financial transaction card production equipment as in claim 2, wherein the customer identifier comprises a machine readable code and the equipment further comprises a code reader.

4. Computerized financial transaction card production equipment as in claim 3, wherein the customer identifier comprises a barcode and the equipment further comprises a barcode reader.

5. Computerized financial transaction card production equipment as in claim 1, wherein equipment configured to apply financial information from the financial record to the card material comprises an embosser.

6. Computerized financial transaction card production equipment as in claim 5, wherein the equipment comprises a reader operable to read a customer identifier comprising a barcode or other machine-readable identifier.

7. Computerized financial transaction card production equipment as in claim 6, wherein the controller is configured to cause the read customer identifier to be encoded into a magnetic strip of the card material.

8. Computerized financial transaction card production equipment as in claim 6, wherein the controller is configured to look up the emboss record corresponding to the customer identifier.

9. Computerized financial transaction card production equipment as in claim 1, wherein equipment configured to apply financial information from the financial record to the card material comprises an encoder.

10. Computerized financial transaction card production equipment as in claim 9, wherein the equipment comprises a reader operable to read a customer identifier comprising a barcode or other machine-readable identifier.

11. Computerized financial transaction card production equipment as in claim 10, wherein the controller is configured to cause the read customer identifier to be encoded into a magnetic strip of the card material.

12. Computerized financial transaction card production equipment as in claim 10, wherein the controller is configured to look up the emboss record corresponding to the customer identifier.

13. Computerized financial transaction card production equipment as in claim 12, wherein the image processor computer comprises code for assigning the customer identifier to a login session of a customer.

14. Computerized financial transaction card production equipment as in claim 1, wherein the image processor computer is arranged to facilitate customer upload of images for personalization.

15. Computerized financial transaction card production equipment as in claim 14, wherein the image processor computer comprises code for assigning the customer identifier to a login session of a customer.

16. Computerized financial transaction card production equipment as in claim 1, wherein the image processor computer is arranged to facilitate customer selection of images from an image library.

17. Computerized financial transaction card production equipment as in claim 1, wherein the image processor computer comprises a module for generating the customer identifier.

18. Computerized financial transaction card production equipment as in claim 1, configured to connect to a computer system of a card issuer comprising a module to generate the customer identifier.

19. Computerized financial transaction card production equipment as in claim 1, wherein the financial record of the remote customer comprises an embossing record.

20. Computerized financial transaction card production equipment as in claim 1, wherein the customer identifier is provided with the personalized image, and equipment comprises a reader configured to interpret the customer identifier and cause the controller to fetch the relevant financial record.

21. Computerized financial transaction card production equipment as in claim 1, wherein the customer identifier is provided with a financial record, and equipment comprises a reader configured to interpret the customer identifier and cause the controller to fetch the relevant personalized image.

22. Computerized financial transaction card production equipment as in claim 1, wherein the equipment performing application of financial information from the financial record to the card material comprises an encoder for encoding a magnetic strip of the card with financial information from the financial record.

23. Computerized financial transaction card production equipment as in claim 1, wherein the equipment performing application of financial information from the financial record to the card material comprises an embosser.

24. Computerized financial transaction card production equipment as in claim 1, wherein the customer identifier comprises encrypted customer information created from encrypted financial account information of the remote customer.

25. Computerized financial transaction card production equipment as in claim 1, wherein the image processor computer comprises means for embedding the customer identifier in the personalized image.

26. Computerized financial transaction card production equipment as in claim 1, wherein the image processor computer comprises means for embedding the customer identifier in the personalized image as a machine readable code.

27. Computerized financial transaction card production equipment as in claim 1, wherein the image processor computer comprises means for embedding the customer identifier in the personalized image as a bar code.

28. Computerized financial transaction card production equipment as in claim 1, wherein the image processor computer comprises means for embedding the customer identifier in the personalized image as meta data.

29. A computer system for producing personalized financial transaction cards, the computer system comprising:
   a server for generating a browser-based user interface for displaying on a remote terminal a graphical representation of at least a portion of an image, said interface being capable of effecting a plurality of manipulations to the graphical representation;
   an internet communications link coupling the remote user interface to an image processor, said link being operable to receive instructions defining said plurality of manipulations applied to the graphical representation from the remote terminal;
   an image processor operable to access the image to apply manipulations emulating those applied to the graphical representation according to the instructions;
   financial transaction card production equipment operable to apply the resulting image to a financial transaction card; and
   the image being associated with a user identifier comprising encrypted customer information.

30. A system for operating a computer to facilitate production of a personalized financial transaction card, the system comprising:
   computer program means for presenting to a remote customer a user interface;

image instruction means for receiving instructions for manipulation of an image file, the instructions being based on manipulations performed by the remote customer with regard to a representative version, on the user interface, of the image that is contained in the file;

image processing means for providing an image, produced based on said instructions for manipulation, for application to the financial transaction card, the image being associated with a customer identifier corresponding to the remote customer, and wherein the customer identifier comprises encrypted customer information.

31. A system for operating a computer to facilitate production of a personalized financial transaction card, the system comprising:

computer program means for presenting to a remote user an user interface:

image instruction means for receiving instructions for manipulation of an image file, the instructions being based on manipulations performed by the remote user with regard to a representative version, on the user interface, of the image that is contained in the file;

image processing means for providing an image, produced based on said instructions for manipulation, for application to the financial transaction card, the image being associated with an unique identifier corresponding to the remote user, wherein the unique identifier is used to obtain the associated image and provide it to a printer for printing the image on to the blank card material, and wherein the customer identifier comprises encrypted remote user information.

* * * * *